Oct. 8, 1940.  H. VAN CLEVE ET AL  2,216,927
NOOSE SUPPORTING DEVICE FOR SNARETYPE TRAPS
Filed May 12, 1938  2 Sheets-Sheet 1
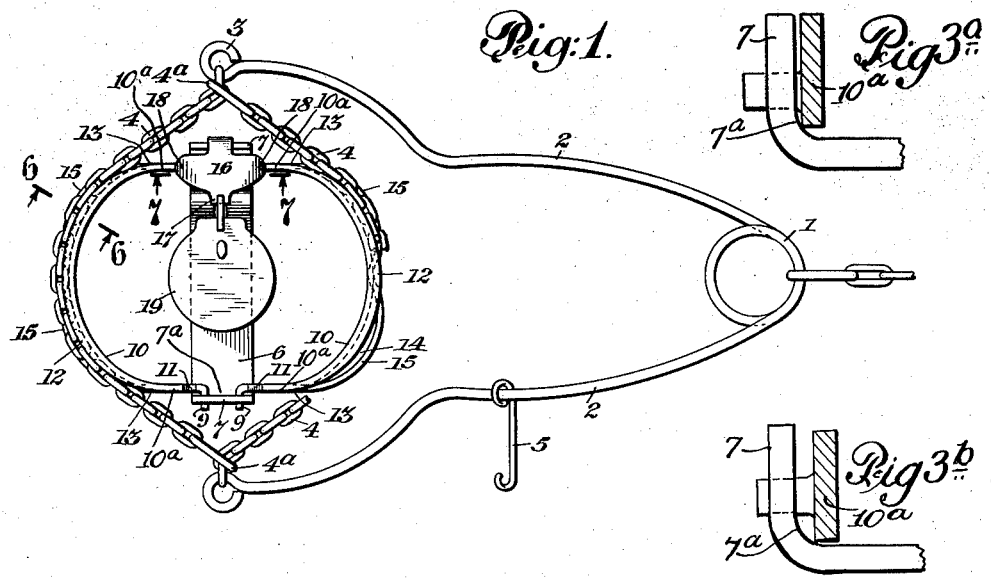
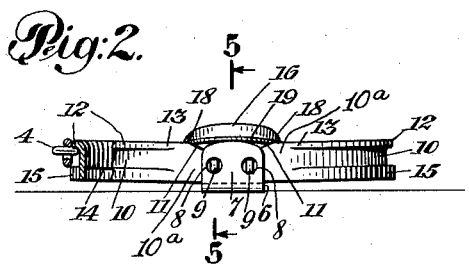
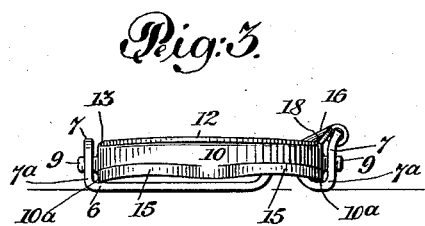
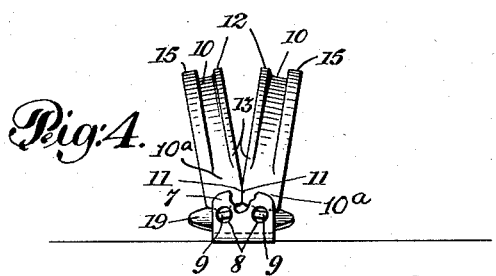
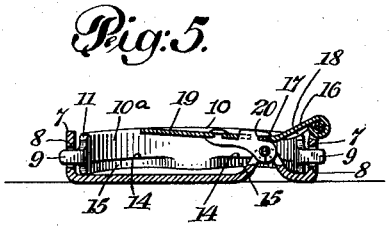
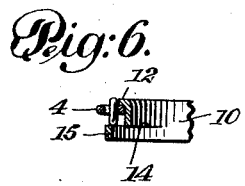
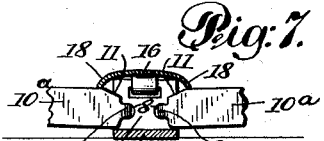
INVENTORS
Harry Van Cleve
Hershey Roy Graybill
BY
ATTORNEY Oct. 8, 1940.  H. VAN CLEVE ET AL  2,216,927
NOOSE SUPPORTING DEVICE FOR SNARE TYPE TRAPS
Filed May 12, 1938  2 Sheets-Sheet 2
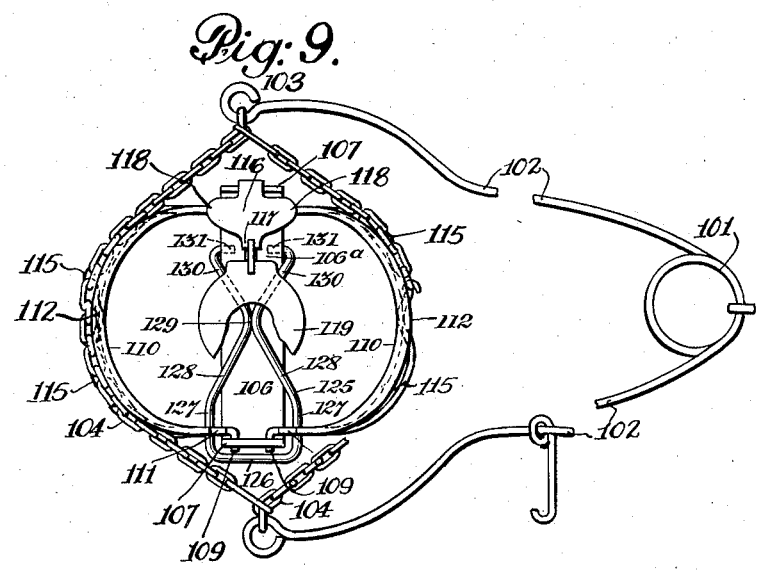
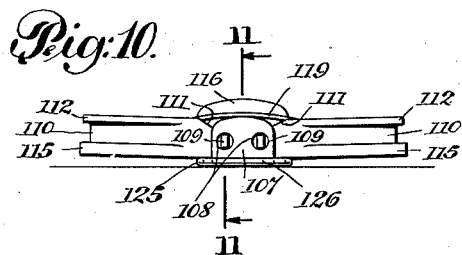
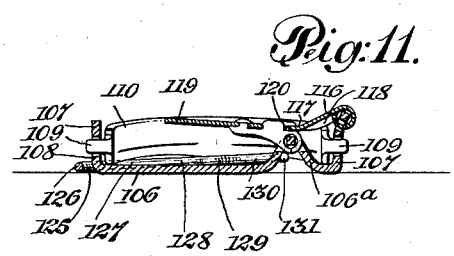
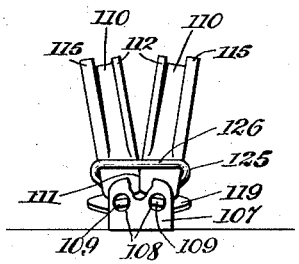
INVENTOR
Harry Van Cleve
Hershey Roy Graybill
BY
Louis Prevost Whitaker
ATTORNEY Patented Oct. 8, 1940

2,216,927

UNITED STATES PATENT OFFICE 2,216,927

NOOSE SUPPORTING DEVICE FOR SNARETYPE TRAPS

Harry Van Cleve, Lititz, and Hershey R. Graybill, Manheim, Pa., assignors to Animal Trap Company of America, Lititz, Pa., a corporation of Pennsylvania Application May 12, 1938, Serial No. 207,466

9 Claims. (Cl. 43—87)

Our invention consists in the novel features hereinafter described, reference being had to the accompanying drawings which illustrate two embodiments of our invention, and the said invention is fully disclosed in the following description and claims.

Our invention relates to animal traps of the type, sometimes called snare traps, in which a flexible noose usually formed of metallic chain or wire, is operatively connected with a spring tending to close the noose upon an animal's leg when released, and cooperating with means for holding the noose in the set position of the trap open, or in other words, in set shape or form, as to facilitate the placing of the animal's foot within it, said means being capable of being released by the pressure of the animal's foot within said noose.

One of the objects of our invention is to provide a noose supporting and guiding device comprising a pair of oppositely hinged or pivoted noose supporting and guiding members, constructed with means for preventing them from closing upon the leg of the animal, and having around their outer edges guiding means for retaining the noose under a strain imparted thereto by the spring associated therewith, said members being provided with locking means, including a tripping or releasing pedal, which will securely lock the members in the set position of the trap, and prevent its accidental release, while at the same time, said members can be released by a very light pressure of the animal's foot on the tripping or releasing pedal, and without the necessity of enlarging the loop to permit their release, thereby rendering the trap exceedingly sensitive. According to a modification of our invention, we further provide the pivoted noose supporting and guiding members with an auxiliary spring, acting against the locking means in the set position of the trap for effecting an exceedingly quick response of the said members to release the noose before the upward pressure of the noose thereon comes into play to insure a catch.

In the accompanying drawings,

Fig. 1 is a plan view of the entire trap in set position, a portion of the noose being broken away at one point to show the guiding portions on the adjacent pivoted supporting and guiding member.

Fig. 2 is an end elevation of the noose supporting and guiding device in set position, a portion of the chain forming the noose being indicated at one side of the figure.

Fig. 3 is a side elevation of the part shown in Fig. 2.

Fig. 3a is an enlarged detail view, partly in section, showing portions of the base plate and one of the adjacent arms of the noose supporting and guiding device shown in Fig. 3. Fig. 3b is a similar view showing the parts in completely set position.

Fig. 4 is an end elevation of the noose supporting and guiding device, showing the supporting and guiding members in released position.

Fig. 5 is a longitudinal, sectional view of the noose supporting and guiding device, showing the locking means and releasing or tripping pedal.

Fig. 6 is a detail sectional view on the line 6—6 of Fig. 1.

Fig. 7 is a detail sectional view on the line 7—7 of Fig. 1.

Fig. 8 is a detail perspective view of the locking device for the noose supporting and guiding members.

Fig. 9 is a plan view of the noose supporting and guiding device, showing an auxiliary spring for acting upon the supporting and guiding members thereof.

Fig. 10 is an end elevation of the parts shown in Fig. 9.

Fig. 11 is a longitudinal section of the device shown in Fig. 10 on the line 11—11.

Fig. 12 is an end view of the parts shown in Fig. 10, showing the noose supporting and guiding members in released position.

Referring to the accompanying drawings, we have shown a conventional form of noose and tension device therefor, the specific form of which forms no part of our present invention. In this instance, the tension device comprises a spring bar, bent or formed at a central portion into a coil spring 1, and providing a pair of arms 2—2, terminating hooks, eyes or other securing means indicated at 3, the loop proper being conveniently formed by two sections of chain indicated at 4—4, each section of which is connected to one of the terminal portions 3, of the tension device, and is provided with a ring 4a, at its opposite end, through which the other chain is passed, thus forming the noose. The tension devices 2—2, are conveniently provided with a hook 5, pivotally engaging one of the arms 2, and adapted to hook over the other arm, when the arms are brought together in the set position of the trap to facilitate setting it. This hook will, of course, be disengaged when the trap is fully set.

The noose supporting and guiding device comprises a base plate 6, having upturned ends 7, provided with pivotal apertures 8—8, to receive the pivotal portions 9, of a pair of arcuate members 10, and hold them in pivotal relation therewith. These arms have somewhat the appearance of the jaws of a steel trap, but unlike such jaws, are provided with arresting means for preventing them from ever coming together upon the leg of the animal while permitting them to swing from a substantially horizontal position, indicated in Fig. 2, to an angular position with respect to each other, indicated in Fig. 4. In the present instance, the end portions of each of these pivoted members 10, are provided adjacent to their pivots with inclined arresting shoulders 11, which meet as the members are raised on their pivotal connections and arrest them in wide open position, as clearly shown in Fig. 4. Obviously, these pivoted members might be arrested in other ways, if desired. The outer surfaces of the pivoted supporting and guiding members 10, are provided with guiding means for engaging the opposite portions of the noose in the manner indicated in Fig. 1, and preventing it from slipping off of the outer surfaces of said members, either downwardly or upwardly, when the trap is set. We find it convenient to provide each of the members 10, at its inner edge with a short flange 12, which is entirely discontinued at points 13, adjacent to the pivoted ends of said members, for the purpose of facilitating the disengagement of the noose from the guiding and supporting members when the trap is sprung. The opposite edge of each of the members 10, might likewise be provided with a similar flange, but as the noose is ordinarily formed of chain, we find it convenient to form such additional flange by slitting the central curved portion of the member at two points, as indicated at 14—14, and bending outwardly a narrow strip of the metal, as indicated at 15, forming curved or bowed projecting portions which support the noose. With this construction, there is no danger of the noose being caught between the flange 12, and the opposite projecting portions 15, when the trap is sprung, and the noose will free itself from the supporting and guiding members 10, with absolute certainty and accuracy.

Obviously, when the trap is to be set, the pivoted guiding and supporting members 10 are in approximately horizontal position, as indicated in Figs. 2, 3 and 5. They are not, however, exactly horizontal, but as a matter of fact are preferably inclined upwardly slightly from their pivotal points, as clearly indicated in Fig. 2, for example, in order that they may respond instantly to the tension of the noose, when the trap is released, and swing into their uppermost positions to release the noose without having to expand the noose to any extent whatever. The upwardly extending ends 7, 7, of the base plate 6 are (one or both) curved near their union with the base plate 6, with curved portions 7a, 7a, Figs. 3 and 5, which are in the path of the arms 10a of the guiding and supporting members 10, so that when the said members are placed in a substantially horizontal position, as in setting the trap, the arms 10a engage the curved portions 7a of the ends 7 as indicated in Fig. 3a and are forced slightly inwardly, see Fig. 3b toward each other when in completely set position. The reaction, therefore, of the arms 10a against the curved portions 7a tends to swing said guiding and supporting members upwardly on their pivots out of a horizontal position. In order to lock them in this set position, we provide one of the upturned ends of the base plate with a pivoted locking device, indicated at 16, which is provided with a locking detent 17 at its free end, and is also provided with downwardly turned cam portions 18, 18 to engage the upper or inner edges of the pivoted supporting and guiding members. The base plate is also provided with a trip or pedal 19, pivotally secured thereto, and provided with a locking notch 20, to engage the locking detent 17 of the locking plate.

In order to set the trap, the arms 2, 2 of the tension device will be brought together and secured temporarily by the hook 5, which leaves the noose loose enough to be placed in engagement with the noose supporting and guiding members in their set positions. These pivoted members are then placed in approximately horizontal position, as indicated in Figs. 2, 3 and 5, for example, and secured by folding over the locking plate 16, and securing the locking detent thereof in the locking notch 20 of the trip pedal 19. When the parts are placed in this position, the upward pressure of the arms 10a of the members 10 will be exerted on the cam portions 18 of the locking device 16, and will produce an upward pressure of the detent 17 against the upper edge of the notch 2, thus holding the members 10 in fixed position while the noose is being placed around them between the guiding portions 12 and 15 thereof, in the manner illustrated in Fig. 1, after which the hook 5 of the tension device will be removed, permitting the tension of the noose to be applied to the pivoted supporting and guiding members 10, in a direction toward their pivots, the entire force of the tension device being applied to the noose supporting and guiding arms 10. The tension of the noose is exerted above the pivotal connections and tends to cause the arms to move upwardly and together, which is resisted by the cam portions 18, 18 of the locking plate 16. This in turn produces an increase in the upward pressure of the detent 17 on the upper wall of the recess 20 of the trip pedal, thus holding the parts very rigidly in position so that the entire trap can be handled in set position, carried to the desired point of use, and placed on the ground.

It will be seen that the noose supporting and guiding members hold the noose in wide open position, and that the pivoted trip pedal which is located substantially centrally of the pivoted members 10, will occupy a position substantially centrally of the noose in the set position of the trap. A very slight pressure of the foot of an animal on the trip pedal 19 will depress it sufficiently to release the locking plate when the tension of the noose on the pivoted members 10, together with the upward pressure of the spring ends 7, will cause them to instantly rise toward each other until arrested by their meeting shoulders 11, 11, in nearly vertical position. The noose formed by the oppositely disposed chains 4, will instantly be contracted and simultaneously raised by the upward swing of the pivoted members 10, and will also be readily disengaged from the members 10 by sliding over the edges of the flanges 12, 12 from the points 13, at which they are discontinued, upwardly to the central portion, permitting the noose to be instantly contracted upon the leg of the animal at a distance above the foot, and hold it without injury to the animal.

It will be noted that by reason of the fact that the guiding and supporting members 10 are so pivoted with respect to the base plate, that when in set position, the tension of the noose has a tendency to raise the central portions of these members 10, the said members respond instantly to the tension of the noose and its tension means, as soon as the locking plate is released, and swing upwardly to raise and disengage the noose without having at any time to increase the size of the noose in so doing. As a result of this construction, the trap is very easily tripped, and the closing of the noose commences at once, without first expanding the noose, thus making a very delicate set, and practically securing a catch in every instance.

In Figs. 9 to 12 inclusive, in which the parts corresponding with those previously described are given the same reference numerals with the addition of one hundred, we have shown a slight modification of the noose supporting and guiding device which it will be understood is adapted for use with the noose and spring arms shown in Fig. 1, or their equivalents. In this instance the noose supporting and guiding members are provided with an independent actuating spring in order to start the upward movement from set position, even more rapidly than they would be moved by the tension of the noose, and the tension of the compressed supporting and guiding members 10 against the curved portions 7a, 7a, as previously described. Provision of an auxiliary spring for the noose supporting and guiding members may be accomplished in a number of ways. In these figures we have shown a spring formed of a single piece of wire 125, forming a loop at its central portion, comprising a cross bar 126, lateral arms 127, and converging arms 128, which approach each other closely at the central portion 129, where they are substantially parallel. These arms are continued to form diverging portions 130, the ends of which are turned inwardly, as indicated at 131, and the arms 130, 130 are bent at a considerable angle to the arms 128, 128, carrying the loop 126, 127. The spring is conveniently attached by separating the arms 130, and hooking the inturned portions 131 under an upwardly bent portion 106a of the base plate 106, to which the trip pedal 119 is pivotally connected, in a well known way, the spring being so placed that the looped portion formed by the parts 126, 127 surrounds the ends of the noose supporting and guiding members 110, adjacent to one end of the same in such manner that the arms 127, engage the lower edges of the parts 110, at points some distance from their pivots to increase the leverage of the spring.

It will thus be seen that in setting the trap the pivoted members 110 will be moved to approximately horizontal position, where they will be held under the action of the compressed spring when the trap is fully set, and immediately upon the releasing of the trip pedal and locking plate, the force of the auxiliary spring will be exerted through the arms 127, so as to cause the pivoted members 110 to start upwardly very quickly, which renders the trap somewhat more sensitive and more quickly responsive to the tripping action than would be the case where the tension means for the noose is relied on to produce this action, since the tension of the noose is inward rather than upward.

The tension device of the noose will be provided with a suitable chain or other flexible connection by which the trap may be secured to a post or other permanent device to retain the animal when caught.

It will be noted that the tendency of the members 10 (or 110) to move upwardly against the locking plate 16 (or 116) whether produced by the reaction between the members 10 (or 110) and the curved portions 7a of the upturned ends 7 of the base plate or by an independent spring will insure the noose supporting and guiding assembly being held in set position independently of the pressure of the noose. This is a distinct advantage in the operation of setting the trap as it insures that when the noose is placed in position and subjected to its tension means, the supporting and guiding assembly will have necessarily remained in set position to receive the strain of the noose and its tension means.

We also wish it to be understood that while we have referred to the inward springing of the opposite ends of the members 10 by the curved portion 7a of the upturned ends of the base plate, the same result could be accomplished by having the upturned ends 7 yield slightly outwardly if the material of which the base plate was made was of such character that it would yield under these circumstances.

What we claim and desire to secure by Letters Patent is:

1. In a trap provided with a noose and tension means therefor, a pair of pivoted noose supporting and guiding members the exterior faces of which are directly engaged by the noose, a pivoted locking plate for engaging both of said members and holding them in oppositely and upwardly inclined positions with respect to their pivots under tension of said noose, a tripping pedal located substantially centrally within said members, when in set position, for engaging said locking plate, and holding the noose engaging portions of the said members and the noose in set position, said supporting and guiding members being provided with means for preventing the noose from slipping upwardly thereon when in set position.

2. In a trap provided with a noose and tension means therefor, a pair of pivoted noose supporting and guiding members, pivoted locking means for engaging both of said members and holding them in oppositely and upwardly inclined positions with respect to their pivots under tension of said noose, a tripping pedal located substantially centrally within said members, when in set position, for engaging said locking means, and holding the said members, and the noose in set position, said members being provided at their inner edges with retaining flanges to prevent the noose under tension from slipping upwardly thereon, said flanges being discontinued adjacent to the pivoted portions thereof to facilitate the freeing of the noose therefrom, when the trap is sprung.

3. In a trap provided with a noose and tension means therefor, a pair of pivoted noose supporting and guiding members, each having its outer face provided with a noose retaining portion at its inner edge, and noose retaining portions at its outer edge, formed by integral parts thereof, severed longitudinally therefrom, and bent outwardly between their ends, a pivoted locking plate provided with oppositely disposed cam portions for engaging the inner edges of said members in the set position, and having a locking detent, and a pivoted tripping pedal located substantially centrally with respect to said pivoted members, and having a locking recess to engage said detent.

4. In a trap provided with a noose and tension, means therefor, a pair of pivoted noose supporting and guiding members, each having its outer face provided with a noose retaining portion at its inner edge, and noose retaining portions at its outer edge, formed by integral parts thereof, severed longitudinally therefrom, and bent outwardly between their ends, a pivoted locking plate provided with oppositely disposed cam portions for engaging the inner edges of said members in the set position, and having a locking detent, and a pivoted tripping pedal located substantially centrally with respect to said pivoted members, and having a locking recess to engage said detent, the noose retaining flanges of said members being discontinued adjacent to the pivoted portions thereof, and said members when in set position, inclining upwardly from their pivots.

5. In a trap having a noose and tension means therefor, a noose supporting and guiding assembly comprising a base with upturned portions, a pair of arcuate members pivoted thereto, a locking plate and a tripping pedal having interengaging portions, said upturned portions of the base and the arcuate members having portions brought into springing engagement when said members are moved to approximately horizontal position, the reaction between said members and said upturned portions of the base tending to swing said members upwardly and communicating pressure to said locking plate and trip pedal to hold the assembly in set position independently of the noose.

6. In a trap having a noose and tension means therefor, a noose supporting and guiding assembly comprising a base with upturned ends having curbed portions adjacent to the base, a pair of arcuate members pivotally connected to said ends, a locking plate engaging said members, and a tripping pedal therefor, said arcuate members having portions adjacent to their ends which engage said curved portions when said members are moved to approximately horizontal position, and move the end portions of said members yieldingly toward each other, the reaction between said members and said curved portions tending to swing said members upwardly and communicate pressure to said locking plate and tripping pedal to hold the assembly in set position independently of the noose.

7. In a trap provided with a noose and tension means therefor, a pair of pivoted noose supporting and guiding members, pivoted locking means for engaging both of said members, and holding them in oppositely and upwardly inclined positions with respect to their pivots under tension of said noose, a tripping pedal located substantially centrally within said members, when in set position, for engaging said locking means, and holding the said members, and the noose in set position, and an auxiliary spring engaging said members for insuring the quick starting of their movement to released position, and supplementing the action of the tensioned noose.

8. In a trap provided with a noose and tension means therefor, a pair of pivoted noose supporting and guiding members, the exterior faces of which are directly engaged by the noose, a pivoted locking plate for engaging both of said members, and holding them in oppositely and upwardly inclined positions with respect to their pivots under tension of said noose, a tripping pedal located substantially centrally within said members, when in set position, for engaging said locking plate, and holding the said members and the noose in set position, the noose engaging portions of said supporting and guiding members being provided with means for preventing the noose from slipping upwardly thereon when in set position, a base to which said noose supporting and guiding members are pivoted, and an auxiliary spring operatively connected with said base and having a looped portion for engaging both of said members adjacent to their points of pivoting for insuring the quick starting of their movements toward released position and supplementing the action of the tensioned noose.

9. In a trap provided with a noose and tension means therefor, a pair of pivoted noose supporting and guiding members, the exterior faces of which are directly engaged by the noose, a pivoted locking plate for engaging both of said members and holding them in oppositely and upwardly inclined position with respect to their pivots, so that the tension of said noose when the trap is in set position is exerted upon said members in a horizontal plane slightly above the pivotal axes of said members, whereby upon the release of the trap said members will respond instantly to the tension of the noose and swing upwardly to release the noose, a tripping pedal located substantially centrally within said members when in set position for engaging said locking plate and holding said members and the noose in set position.

HARRY VAN CLEVE.
HERSHEY R. GRAYBILL.